United States Patent [19]

Eckels

[11] 4,280,071

[45] Jul. 21, 1981

[54] VAPOR TRAP AND REGULATOR FOR SUPERCONDUCTIVE TURBOGENERATORS

[75] Inventor: Phillip W. Eckels, Penn Hills, Pa.

[73] Assignee: Westinghouse Electric Corp., Pittsburgh, Pa.

[21] Appl. No.: 61,564

[22] Filed: Jul. 30, 1979

[51] Int. Cl.³ .............................................. H02K 9/00
[52] U.S. Cl. ..................................... 310/52; 310/261; 62/511
[58] Field of Search ....................... 310/10, 40, 52, 54, 310/261, 61, 64; 62/505, 511; 165/47, 56, 57

[56] References Cited

U.S. PATENT DOCUMENTS

| 2,781,059 | 2/1957 | Frey ........................................ 62/511 |
| 4,048,529 | 9/1977 | Pomeroy ................................ 310/54 |
| 4,056,745 | 11/1977 | Eckels .................................... 310/52 |
| 4,091,298 | 5/1978 | Gamble .................................. 310/52 |
| 4,194,137 | 3/1980 | Vinokurov ............................. 62/505 |

OTHER PUBLICATIONS

"Improved Thermal Design of the Cryogenic Cooling System"; A. Bejan; M.I.T. 12/74, 2/75.

Primary Examiner—R. Skudy
Attorney, Agent, or Firm—G. H. Telfer

[57] ABSTRACT

A vapor trap is provided for use in a liquid coolant supply pipe of a superconductive generator. The supply pipe has interiorly located, a flow constriction, an annular liquid coolant dam, and means for blocking the vapor flow through the central portion of the supply pipe. These act cooperatively to prevent the coolant vapor within the generator from flowing back through the supply pipe. This would be an undesirable condition most likely to occur during transient operating conditions when the normal flow of liquid coolant is temporarily stopped.

11 Claims, 6 Drawing Figures

VAPOR TRAP AND REGULATOR FOR SUPERCONDUCTIVE TURBOGENERATORS

BACKGROUND OF THE INVENTION

This invention relates to an electrical machine employing a superconductive rotor, and more particularly to a method and apparatus for performing a vapor trap function within the pipe supplying liquid coolant to the rotor windings of superconductive machines.

It is a well known phenomenon that many metals, alloys and chemical compounds substantially lose all of their electrical resistance at temperatures near absolute zero. This phenomenon has highly advantageous applications when applied to electrical alternators or generators. To achieve the advantages resulting from superconductivity in the generator, and in particular, the electrical winding thereof, the winding must be operated below the critical temperature (above which the winding returns to its normal resistive conducting state). The critical temperature itself is a function of conductor current density and magnetic field strength. In general, the lower the temperature, the greater the current density and magnetic field may be.

In the past, it has been proposed to operate generators in their superconducting mode by submerging them in a liquid helium pool to keep the temperature of the winding below its critical temperature.

Generally speaking, the construction of a generator or alternator for superconductive operation entails the provision of a generally cylindrical, gas-tight outer shell that rotates with the shaft of the rotor. The electrical winding (hereinafter "winding") is disposed interiorly of and spaced a slight distance inwardly from the shell and rotates with the shaft. A quantity of helium is placed inside the shell. This quantity must be sufficient to fully submerge the winding in liquid helium when the generator rotates at its normal operating speed. During operation, the pool forms an inwardly facing liquid helium interface from which helium boils off into a gaseous center or core space of the rotor. Means must be provided to replenish the helium as it boils off and to keep the helium bath at sufficiently low temperatures so that the winding will remain below the critical temperature at all times.

Liquid helium is normally introduced into the shell interior via a liquid coolant supply pipe extending from the exterior of the shell to the core space. Typically the liquid coolant supply pipe is positioned interiorly within a central bore in one of the shafts. The supply pipe rotates with the shaft of the rotor. From the liquid coolant supply pipe the coolant flows into at least one coolant distribution conduit positioned interiorly of the shell and in fluid communication with the supply pipe.

Helium vapor is normally withdrawn through a similar bore at either end of the rotor for recirculation through a conventional refrigeration system.

Due to the importance of coolant flow in establishing and maintaining the generator in the superconducting state, flow regulation is instrumental in the continued development of this technology towards economic commercial application.

One group of regulators employs a coolant distribution conduit specifically designed to establish a hydrostatic bucking pressure against the inlet flow. This pressure regulates the flow of coolant into the rotor. One such regulator incorporates a "U" shaped tube which acts as a liquid trap. The bend in the tube is designed to maintain a quantity of the liquid coolant in the coolant distribution conduit at all times. This design thereby prevents coolant vapor present within the core from flowing into the liquid coolant supply pipe.

Examples of this type of flow regulation are found in the designs contained in the U.S. Pat. No. 4,048,529 issued on Sept. 13, 1977 to Pomeroy; and U.S. Pat. No. 4,091,298 issued on May 23, 1978 to Gamble.

Desirable is a compact design for a flow regulator which can accomplish the vapor trap function without suffering from resonant vibration or from material fatigue failure under transient, extreme conditions. Such a regulator should further be capable of delivering a controlled predetermined flow of liquid coolant over a wide range of operating conditions.

SUMMARY OF THE INVENTION

A superconducting generator constructed in accordance with the present invention is comprised of an electrical winding carried by a rotatable shaft, a fluid impervious shell surrounding the winding and a fluid pervious cage disposed interiorly of the winding, all connected with the shaft for synchronized rotation therewith. A liquid coolant supply pipe coaxially extends from the interior of the cage within the generator to the exterior thereof. The supply pipe has, interiorly located, a vapor trap means comprising three features. They are: means for forming an annular pool within the supply pipe, means for blocking vapor flow, and means for positively rotating said liquid coolant. From the supply pipe the liquid coolant flows through at least one coolant distribution conduit. This conduit is in fluid communication with the supply pipe and disposed interiorly of the shell for directing liquid coolant from the supply pipe into the shell at locations proximate the windings.

A refrigeration system for withdrawing the coolant vapor from the interior of the shell condensing the vapor, and recycling the liquid coolant to the liquid coolant supply pipe completes the hydraulic path for a coolant, such as helium.

BRIEF DESCRIPTION OF THE DRAWINGS

The features of the invention believed to be novel are set forth with particularity in the appended claims. The invention itself, however, as to the organization, method of operation, and objects and advantages thereof, may best be understood by reference to the following description taken in conjunction with the accompanying drawings in which:

DESCRIPTION OF THE PREFERRED EMBODIMENT

Figure 1:
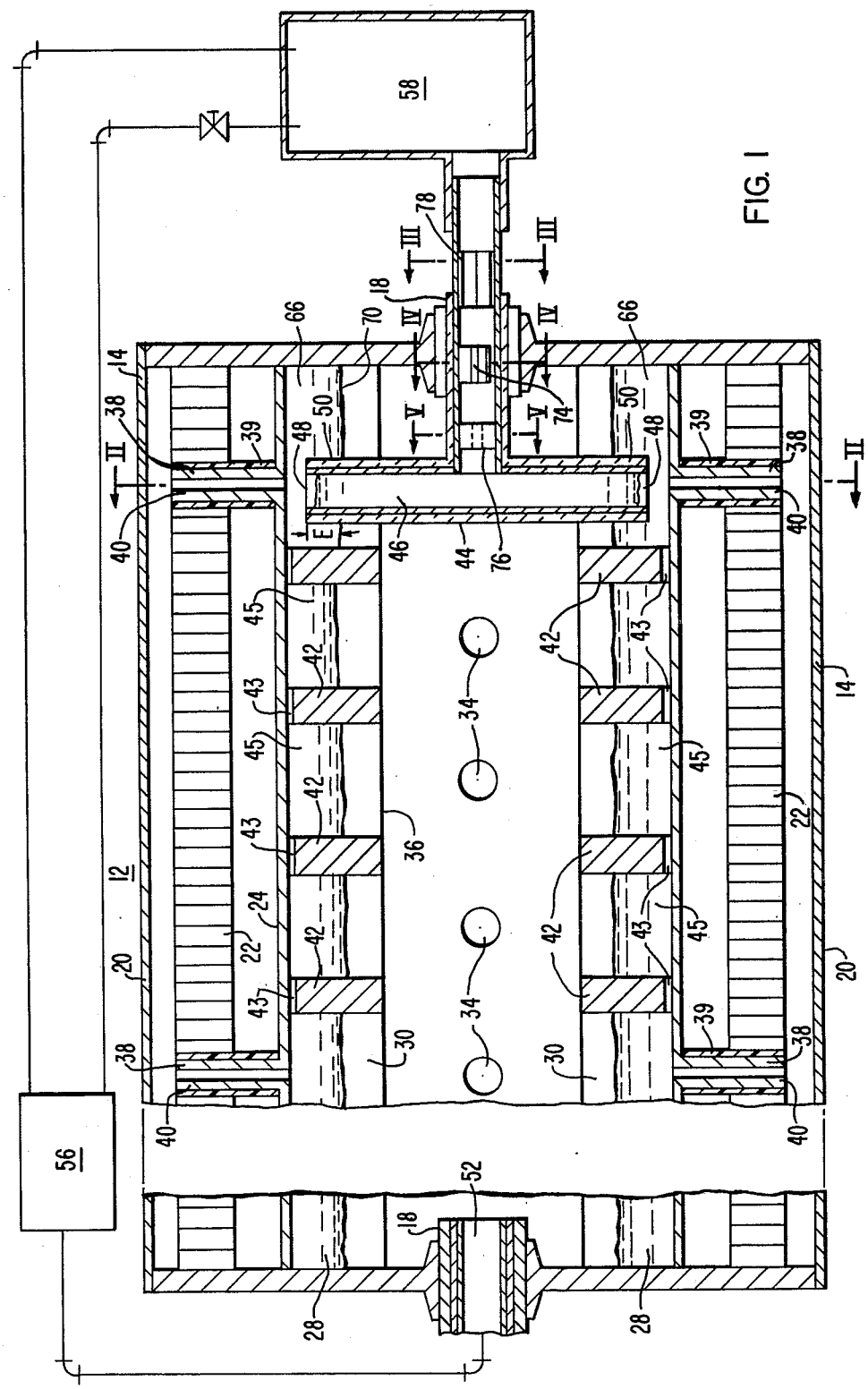
FIG. 1 is a side elevation view, in section, through a generator-rotor for operation in its superconductive state, constructed in accordance with the present invention and including a schematic illustration of the refrigeration system employed by the rotor.
Figure 2:
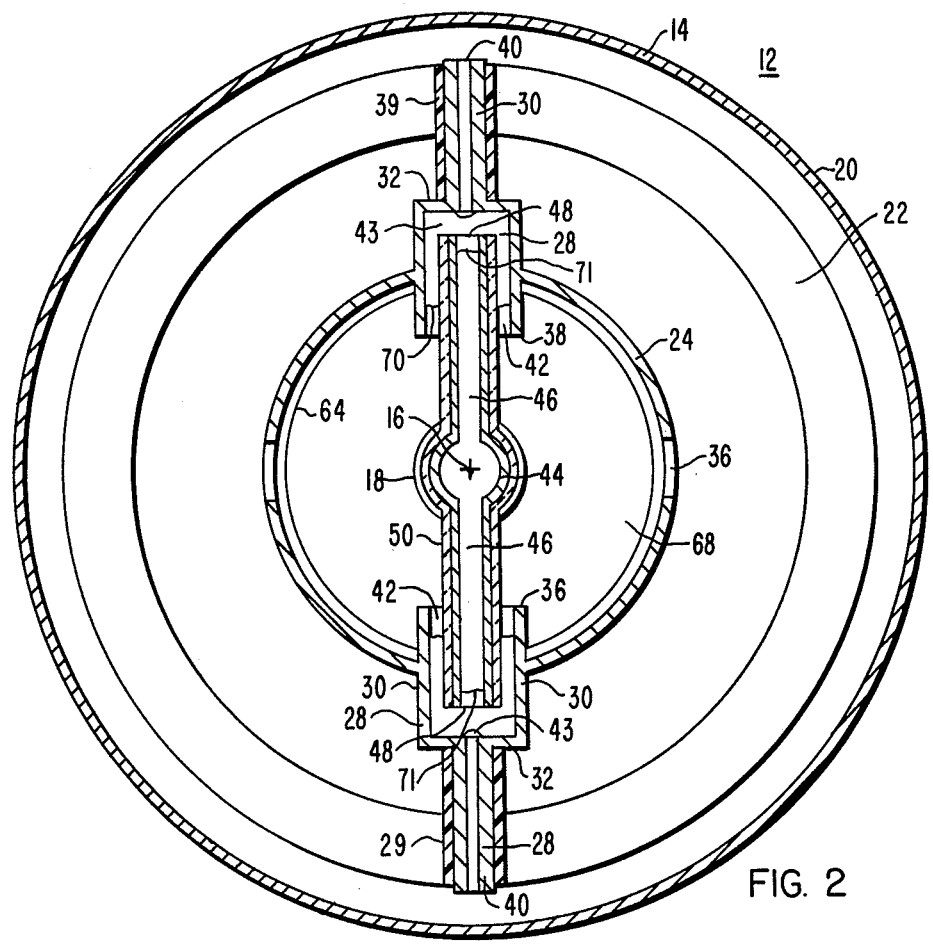
FIG. 2 is a front elevational view in section and is taken along line II—II of FIG. 1.

Referring to the drawings, an electric generator/alternator 12 includes a schematically illustrated rotor 14 that rotates about its axis of rotation 16 within a stator (not separately shown). The rotor has aligned shafts 18 that are journaled in suitably constructed bearings (not separately shown). An outer, gas and liquid impervious shell 20, an annular electrical winding 22 and an inner, gas and liquid pervious cage 24 are mounted to the shaft for coaxial rotation therewith. To facilitate the description and understanding of the present invention the illustrated embodiment shows the shell, the winding and the cage as being somewhat independent of and spaced from each other. In actuality these members are sandwiched together with only small spacings between them.

The cage 24 is preferably of a unitary construction and includes two substantially semi-cylindrical sections extending axially over the length of the rotor. Opposing edges of the semi-cylindrical sections are joined by axially extending, inwardly (towards axis 16) open troughs 28. The troughs are relatively narrow, that is they extend over an arc substantially less than 360°, and they have parallel side walls 30 and a bottom 32 interconnecting the radially outermost portions of the side walls. Innermost edges 36 of the side walls are positioned radially inward relative to the semi-cylindrical sections of the cage. The cage also includes a plurality of apertures 34 to render the cage, and in particular the semi-cylindrical sections thereof fluid pervious, that is to permit liquid and gases to flow in a radial direction past the cage.

A plurality of axially spaced apart, heavy walled heat exchanger tubes 38 extend from trough bottom 32 in a radially outward direction and they have free ends 40 proximate to but spaced from the inside of outer shell 20. The heat exchanger tubes extend beyond the electrical winding 22 of the rotor 14. Tubular thermal insulators 39, constructed of nylon or another suitable insulation material, are placed over the exterior of heat exchanger tubes 38 to prevent sensible heat of compression produced in the liquid coolant flowing through the tube from being transmitted to the coolant bath in which the winding 22 is submerged. In this manner, sensible heat is conducted by the tubes 38 to cage 24 and results in an increased coolant boil-off from the inner bath surface 64 without "heating" the portion of the bath in which the winding is submerged.

The heat exchanger tubes 38, the troughs 28 and the semi-cylindrical section of the cage 24 are constructed of a thermally conductive material, such as OFHC copper, and they are thermally coupled such as by integrally constructing them or by suitably welding or brazing them together to effect a high degree to thermal conductivity between them.

A plurality of axially spaced, liquid pervious, baffle walls 42 constructed of a liquid pervious material such as porous bronze are distributed over the length of troughs 28 and suitably secured thereto as by brazing them to the sidewalls 30 of the troughs. The baffle walls 42 prevent the formation of axially travelling liquid waves in the troughs 28 during operation of the rotor 14. In addition, the baffle walls 42 provide nucleation sites within the liquid coolant pools in the troughs to promote a uniform coolant boiling in the troughs 28 and prevent the formation of local temperature variations.

Each baffle wall 42 includes an axially oriented opening such as a slot 43 facing trough bottom 32 and permitting liquid helium to flow into all trough sections 45 formed by the walls 42.

A liquid helium supply pipe 44 is coaxially disposed within the righthand (as seen in FIG. 1) shaft 18 of the rotor 14 and extends from the exterior to the interior of shell 20. It is fully connected to a pair of radially protruding liquid helium supply conduits 46 which rotate with the pipe 44 and the shaft 18. Free ends 48 of the conduits 46 are disposed in the inwardly opening troughs 28 proximate trough bottoms 32 so that the conduit ends 48 are at all times submerged in a liquid helium pool that forms in the troughs 28 during the operation of the generator 12. insulation 50 on the outside of supply pipe 44 and radial conduits 46 prevent thermo-acoustic oscillations and thermal pumping of helium into the troughs 28 during operation of the generator 12.

The lefthand (as seen in FIG. 1) shaft includes a coaxial helium vapor outlet pipe 52 that is operatively coupled to a liquifier 56, at least one valve and a helium storage container such as a Dewar 58. The refrigeration system circulates the helium, first in its gaseous and then in its liquid phase from the center of the rotor 14 through the refrigeration system back to supply pipe 44.

OPERATION OF THE ROTOR

Turning now to the operation of rotor 14 in its superconducting state in which the electrical winding 22 is cooled below its critical temperature while the rotor is rotated at its operating speed, say 3600 rpm. A sufficient quantity of liquid coolant such as helium is introduced into the interior of shell 20 so that an annular liquid helium bath is formed which submerges the electrical winding 22 as well as cage 24 and which terminates in a cylindrical liquid surface 64 which is radially inward of cage 24 and faces rotor axis 16. The quantity of liquid helium in the rotor is selected so that liquid surface 64 is below, that is radially outward of the axially extending trough edges 36 whereby the trough interrupts the continuity of the cylindrical liquid surface. It is apparent that the formation of the annular liquid helium bath also forms a secondary liquid helium supply pool 66 in troughs 28. During usual operation the level of the pool is slightly above, that is radially inward of the cylindrical bath surface 64 by a distance which is proportional to the pressure drop through the electrical winding.

In order to operate the winding well below the critical temperature of between 4.5° to 5° K. (depending on the winding material) the refrigeration system evacuates a vapor core 68 formed and enclosed by cylindrical bath surface 64 to the vapor pressure of helium or to about one-half atmosphere. The cylindrical bath surface is an evaporating interface which cools cage sections and thereby also the thermally coupled trough side walls 30 and tubes 38 to the helium boil-off temperature of about 3.5° K.

Boiled off helium is replenished with liquid helium flowed into troughs 28 from Dewar 58 via supply pipe 44 and radial conduits 46. During the equilibrium operation of the rotor the supply pool level 70 and the cylindrical bath surface 64 remain constant while helium boiled off the bath is replenished with liquid helium from supply pool 66. The incoming helium flow rate through conduits 46 is controlled by the differential liquid head "E" (FIG. 1) between the liquid helium pool surface 66 and the vapor pressure rise of rotation 71 in the conduit. When a helium demand surge occurs because more helium is boiled off in the helium bath 62 more helium flows out of pool 66 than is replenished through conduits 46. Pool level 70 drops, thereby reducing the differential head "E" until a balance and equilibrium is re-established.

It should be noted that helium flowing inwardly through supply pipe 44 and radial conduits 46 is a two-phase flow of approximately 92–95% by weight of liquid helium and the balance helium vapor. This translates into an approximately 60% (by volume) liquid and 40% (by volume) vapor helium flow. Since the radial conduits are sufficiently large to prevent liquid phase bridging and since the liquid pool level 70 is at ½ atmosphere, there is the above-discussed negligible temperature rise in the incoming liquid helium which is further compensated by a temperature reduction in the liquid helium flow due to the pressure drop between the atmospheric supply pressure and the ½ atmosphere vapor core pressure at pool level 70. Also, there is a phase separation in trough 28 due to centrifugal forces so that pool 66 is a single, liquid helium phase only pool.

Liquid helium only streams outwardly from pool 66 through tubes 38 and is compressed due to the centrifugal forces acting thereon. This generates sensible heat which is transferred to the heavy walled heat exchanger tubes so that liquid helium exiting from free ends 40 of the tubes is of a temperature only slightly, e.g. 0.1° K. above the helium boiling temperature of 3.5° K. Heat withdrawn from the liquid helium stream in the tubes and transferred to the tubes is conducted by the tubes to troughs 28 and cage sections where the heat is absorbed by the approximately 3.5° K. liquid helium in contact with both sides of the cage sections, and with the exterior sides of the troughs and the tubes. The transferred heat causes an additional helium boil-off at the bath interface without affecting, e.g. raising the temperature of the portion of the bath cooling winding 22.

The 3.6° K. liquid helium discharge from tube ends 40 flows generally radially inward past winding 22 towards cage 24. During its inward flow it absorbs heat generated in the winding. It also expands due to the decreasing pressure as it travels radially inwardly. This results in a corresponding temperature reduction which is partially or wholly offset by a temperature increase due to heat absorption from the winding. The effect thereof is that the temperature of the helium normally does not rise appreciably above 3.5° to 3.6° K. and the winding at all times operates well below its critical temperature. A buffer is thereby provided for the ready absorption of sudden heat surges in the winding without permitting the winding temperature to rise above the critical value.

It is apparent that the removal of sensible heat from the liquid helium compressed in tubes 38 requires an addition amount of liquid helium over and above what would be required if the sensible heat were permitted to remain in the helium discharged by the tubes. This additional helium is consumed as an additional helium boil off at bath surface 66. Further, it should be noted that by conducting the withdrawn heat from the tubes 38 via troughs 28 to the cage sections 26 before at least the bulk of such heat is transferred to the helium bath a temperature rise of the bath in contact with the electrical winding and a resulting lesser cooling of the winding is prevented.

THE VAPOR TRAP

Referring once again to the figures, the coolant intake comprises the following elements: The liquid coolant supply pipe 44 extends from the coolant transfer coupling to the core space 68. The supply pipe 44 is in fluid communication at one of its ends with the transfer coupling. At the other end of the supply pipe 44, and in fluid communication with it is at least one coolant distribution conduit 44 positioned interiorly of the shell 20. Disposed interiorly of said supply pipe 44 is a means for trapping the coolant vapor, said means shown generally in FIG. 6. This coolant trap means regulates the coolant flow during transient operating conditions.

The vapor trap means comprises three features. A vapor blocking means 74 is located between a flow constriction means 76 and a spin-up means 78.

Figures 3, 4, 5:
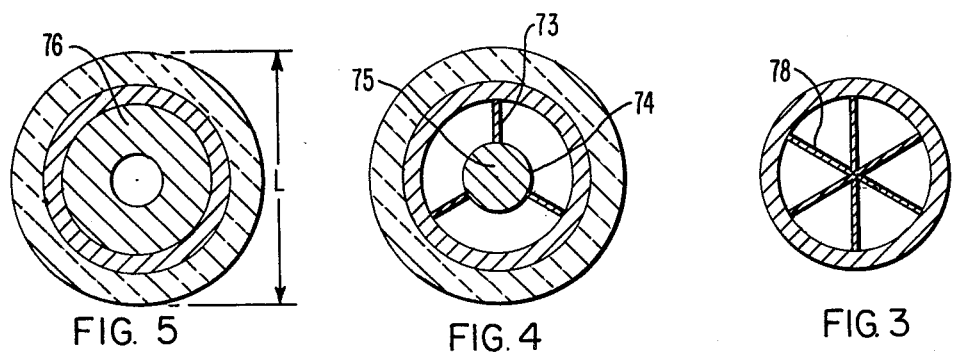
FIG. 3 is a cross-sectional view of the liquid coolant supply pipe taken along line III—III of FIG. 1.
FIG. 4 is a cross-sectional view of the liquid coolant supply pipe taken along line IV—IV of FIG. 1.
FIG. 5 is a cross-sectional view of the liquid coolant supply pipe taken along line V—V of FIG. 1.
Figure 6:
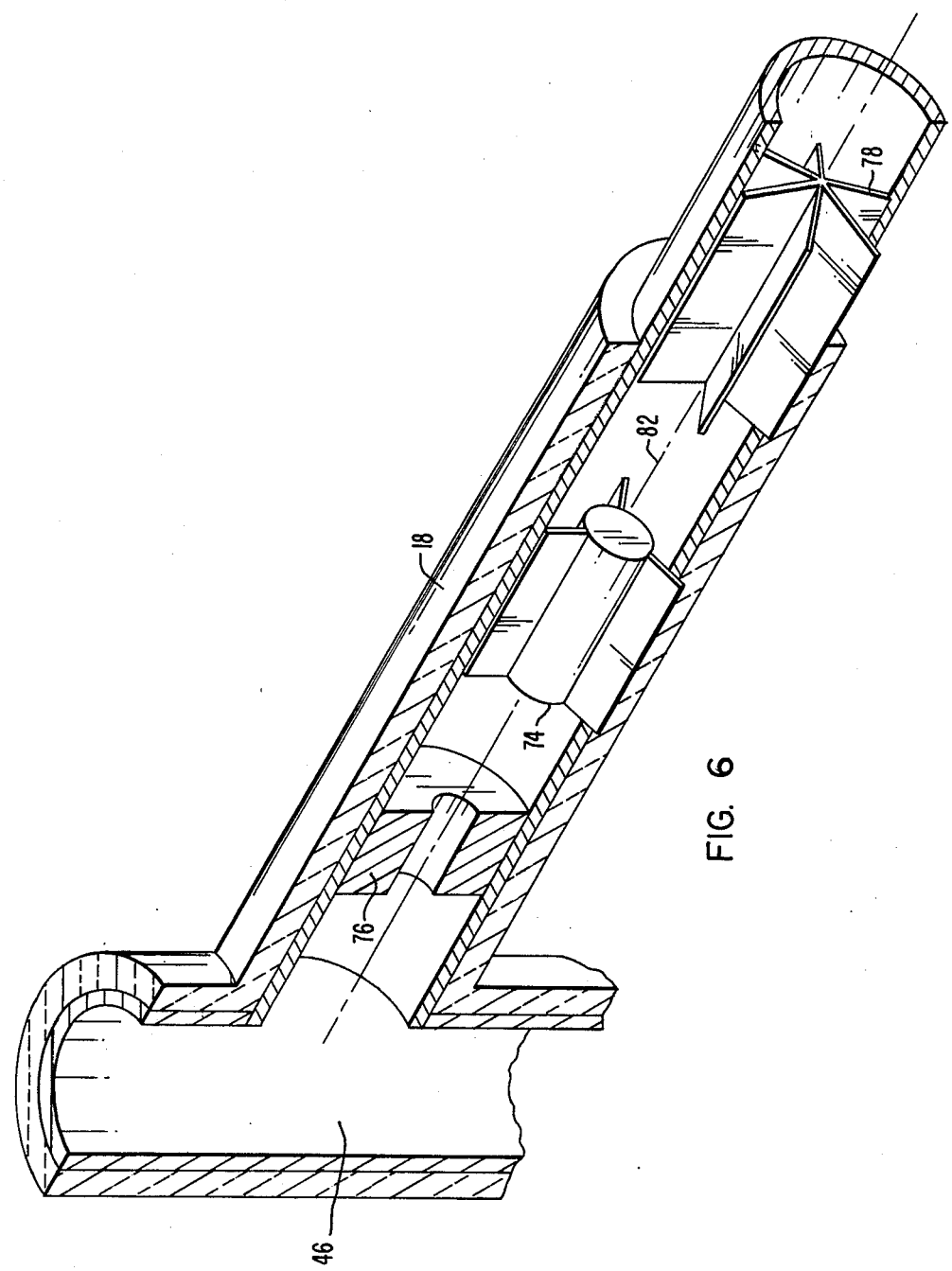
FIG. 6 is an illustration of the liquid coolant supply pipe, containing a vapor trap means constructed in accordance with the invention.

Referring to FIGS. 3 and 6, the spin-up means 78 can be more easily understood. The spin-up means acts to rotate the liquid; bringing the liquid up to solid body rotational velocity. The spin-up means 78 is situated within the supply pipe 44, and is the closest of the above three features to the transfer coupling. In typical operation the liquid received into the rotating supply pipe 44 is not itself rotating. The spin-up means thus accelerates this liquid to a speed synchronous with the speed of rotation of the supply pipe 44. This feature, in conjunction with the flow dam 76, acts to establish an annular pool of liquid coolant proximate to the interior wall of the supply pipe 44. Thus, the liquid classifies against this wall, forming a central core of helium vapor surrounded by the annulus of liquid coolant. The spin-up means 78 may comprise a plurality of solid vanes or sheets radially extending from a central line of the spin-up means 78, said central line being co-linear with the axis of rotation 16. The spin-up means 78 can best be seen in FIG. 6. The figure depicts one possible configuration for the spin-up vanes. Six radially extending vanes are separated one from another by a predetermined angle. Each two adjacent sheets intercept an arc along the inside wall of the supply pipe 44.

One of the design parameters for the spin-up means 78 is the flow area of one segment. This flow area may be defined as the area bounded by two adjacent vanes and the intercepted arc. Another parameter, called the wetted perimeter, is the perimeter around the flow area of one segment. It has been determined that the length of the spin-up means 78, as measured along the central line 82, must be equal to or greater than twelve times the flow area of one segment divided by the wetted perimeter. The wetted perimeter and the flow area of one segment depend on another design parameter: the diameter ("D") defined by the other most edges of the vanes. These are the edges of the vanes which are proximate to the inside surface of the supply pipe 44. The equations are as follows:

Flow area $= 1/24\pi D^2$

Wetted perimeter $= D + 1/5\pi D$

Referring now to FIGS. 5 and 6, the flow dam 76 acts as an annular barrier to the flow of the liquid coolant. In one possible configuration, its cross section is donut-shaped having an outside diameter (designated "L" in FIG. 5), and having an inside diameter which is the diameter of the hole. The inside diameter is sized to limit the pressure within the generator to a set figure, say approximately 38 psia on quench (quench occurring when the winding goes fully resistive while carrying the design current). The flow dam means 76 constricts the flow of the liquid to the supply pipe 44. The flow dam means 76 is concentric to and within the supply pipe 44. The outer diameter and the diameter of the bore have a centerline colinear with center line 82.

The vapor barrier means 74 comprises a cylindrical member 75 disposed concentric to and within the supply pipe 44. It is depicted in FIGS. 4 and 6. The cylindrical member 75 is impervious to fluid flow and has a diameter which is greater than the inner diameter, (the diameter of the central bore) in the flow dam means 76. The centerline of cylindrical member 75 is colinear with centerline 82. The vapor barrier 74 has included therein at least one support element 73 which is fastened, brazed or attached to the inside wall of the supply pipe 44, to maintain the cylindrical member in its position. The vapor barrier 74 may be of any desired thickness so long as it maintains its structural stiffness.

These three features act cooperatively to perform a vapor trap function. The flow dam means 76 in conjunction with the spin-up means 78 establishes and maintains the annular pool of liquid coolant within the supply pipe 44. The central cylindrical member 75 of the vapor barrier means 74 together with this annular pool of liquid acts to substantially block the vapor from proceeding through the supply pipe 44 in the direction of the transfer coupling.

It would be undesirable to have the vapor proceed in this direction because it would be possible, in an extreme case, to have the rotating helium transfer coupling dry out due to the presence of the vapor. A foreseeable consequence of this could be the loss of cryo-pumped vacuum insulation. Also possible under such a condition, would be for the vapor to proceed as far back as the Dewar 58 and therefore result in an overfill of the generator. Though these effects, possible in the absence of a vapor trap, could occur during normal operating conditions of the generator, they are more likely to occur during drastic load changes.

In effect the vapor trap acts as a liquid seal on the vapor. This sealing effect is especially important during an interruption in the flow of liquid coolant; such as in a post-fault condition as may occur after, for example, a lightening flash hitting the lines or after a drastic load change. Under such circumstances, when the steady flow is interrupted, the separation of liquid from gas coolant becomes important. Thus a vapor trap implemented in accordance with the present invention can be utilized to preserve regulating capability during off design as well as normal operation conditions.

METHOD OF OPERATION

A method of implementing the present invention comprises the following steps: The rotor 14 is rotated about its axis. A liquid bath is formed into a generally cylindrical coaxial liquid interface which defines a generally cylindrical coaxial vapor core 68 for the collection of coolant vapor therein. This coolant bath is in contact with the shell 20 and an intermediate member, such as the windings 22. The coolant vapor is evacuated from the core 68. The liquid coolant is directed from the intake, the supply pipe 44, along a path separated from the bath, into the liquid bath. The flow from the supply pipe 44 is then regulated by (a) controlling the flow volume of the liquid coolant flowing from the intake, (b) preventing or blocking the vapor within the shell 20 from flowing through the liquid coolant intake 44, and (c) rotating the liquid coolant in the intake 44 at the speed of rotation of the rotor 14. The liquid coolant is then discharged into the bath at a point between the liquid interface and the shell 20.

The step of preventing the vapor in the shell from flowing through the coolant intake 44 comprises: establishing within the coolant intake 44, an annular pool of liquid coolant surrounding a central vapor space and blocking the flow of coolant vapor through the central vapor space.

The step of establishing an annular pool of liquid coolant can be accomplished, for example, by spinning the liquid coolant within the coolant intake 44 at a rotational speed sufficient to classify the liquid coolant.

I claim:

1. In an internally cooled rotor having a generally cylindrical outer shell concentric with an axis of rotation, a member to be cooled, said member disposed interiorly of the shell for rotation therewith, a liquid coolant intake, rigidly attached to said rotor and concentric with said axis of rotation, a coolant outlet, and a sufficient quantity of liquid coolant introduced into the interior of the shell by the coolant intake, whereby said liquid coolant forms an annular coolant bath when the rotor is rotated at its operating speed, and forms an inner substantially concentric core space surrounded by the bath, whereby evaporated vapor collects in the core space and can be withdrawn from the space through the coolant outlet, THE IMPROVEMENT to the coolant intake comprising:

a stationary means for introducing said liquid coolant into said coolant intake;

a cylindrical axial conduit, connected to and in fluid communication with said coolant intake, said axial conduit disposed interiorly of said rotor and concentric with said axis of rotation;

a pair of radial conduits, connected to and in fluid communication with said axial conduit, said radial conduits disposed interiorly of said rotor in diametrical opposition to each other with their outermost termini in fluid communication with said coolant bath;

a vapor trapping means disposed interiorly of said axial conduit for trapping the coolant vapor and thereby regulating the coolant flow during transient operating conditions.

2. The internally cooled rotor of claim 1 wherein the vapor trapping means comprises: means for constricting the flow of coolant through the axial conduit; means for blocking vapor flow through the axial conduit; and means for rotating said liquid coolant in synchronization with said rotor.

3. The internally cooled rotor of claim 2 wherein said blocking means comprises a solid cylindrical member supporting coaxially with and interiorly of said axial conduit by at least two legs attached to the inside surface of said cylindrical axial conduit, whereby said solid member blocks fluid flow through the central area of the cylindrical axial conduit's cross-section and permits annular fluid flow around said solid member.

4. The internally cooled rotor of claim 3 wherein the means for rotating the liquid comprises a plurality of radially extending vanes disposed interiorly of said axial conduit and which rotate with said cylindrical axial conduit.

5. The internally cooled rotor of claim 4 wherein the means for constricting the flow through the axial conduit is an annular member disposed concentric to and within said axial conduit.

6. The internally cooled rotor of claim 5 wherein said solid cylindrical member disposed concentric to and within said axial conduit, has a diameter which is greater than the bore of said annular member and less than the inside diameter of said axial conduit.

7. A superconducting generator comprising in combination:
an electrical winding carried by a rotatable shaft, a fluid impervious shell surrounding the winding; and a fluid pervious cage disposed interiorly of the winding, all connected with the shaft for synchronized rotation therewith;
a quantity of liquid coolant disposed within the shell;
a liquid coolant cylindrical axial conduit coaxial to said shaft and extending from an interior of the cage to the exterior thereof, said axial conduit having interiorly located a vapor trapping means comprising means for constricting the flow through the axial conduit, means for blocking vapor back flow through said axial conduit, and means for rotating said liquid coolant;
a pair of radial conduits, connected to and in fluid communication with said axial conduit, said radial conduits disposed interiorly of said rotatable shaft in diametrical opposition to each other with their outermost termini in fluid communication with said quantity of liquid coolant.

8. The superconducting generator of claim 7 wherein:
(a) said means for constricting the flow through the axial conduit comprises an annular member disposed concentric to and within said axial conduit, said annular member having a bore therethrough, said bore being concentric with said axial conduit and having a diameter less than the inside diameter of said axial conduit;
(b) said blocking means comprises a cylindrical member disposed concentric to and within said axial conduit, said cylindrical member being impervious to fluid flow and having a diameter which is greater than the diameter of the bore in said annular member, and less than the inside diameter of said axial conduit; and
(c) said means for rotating the liquid comprises a plurality of radially extending vanes within the axial conduit, said vanes mounted within said axial conduit for synchronous rotation with said axial conduit.

9. A method of cooling a rotor having an axis of rotation, a concentric outer, fluid impervious shell, a fluid pervious member disposed intermediate the shell and the axis, a liquid coolant intake coaxial to said axis of rotation establishing fluid communication between the interior of the shell and the exterior thereof, and a coolant vapor outlet for removing coolant vapor from the interior of the shell, the method comprising the steps of: rotating the rotor about its axis; forming a liquid coolant bath in contact with the shell and the intermediate member, the bath forming a generally cylindrical, coaxial liquid interface which defines a generally cylindrical, coaxial vapor core for the collection of coolant vapor therein; evacuating coolant vapor from the core; flowing liquid coolant from the intake along a path separated from the bath into the liquid bath; regulating the flow from the intake by (a) controlling the flow volume of the liquid coolant flowing from the intake, (b) preventing the vapor in the shell from flowing back through the coaxial liquid coolant intake, and (c) rotating the liquid coolant in the coaxial intake at the speed of rotation of the rotor; and discharging the flowing liquid coolant into the bath at a point between the liquid interface and the shell.

10. The method of claim 9 wherein the step of preventing the vapor in the shell from flowing back through the coaxial coolant intake comprises: establishing, within the coaxial coolant intake, an annular pool of liquid coolant surrounding a central vapor space; and blocking the flow of coolant vapor through the central vapor space.

11. The method of claim 10 wherein the step of establishing an annular pool of liquid coolant is accomplished by spinning the liquid coolant within the coolant intake at a rotational speed sufficient to classify the coolant into its vapor and liquid parts.

* * * * *